United States Patent

Kriebernegg et al.

[11] Patent Number: 4,942,951
[45] Date of Patent: Jul. 24, 1990

[54] LIQUID FRICTION COUPLING AND MOTOR VEHICLE COMPRISING THE SAME

[75] Inventors: August Kriebernegg, Köflach; Heribert Lanzer, Gössendorf; Othmar Peier, Pöllau, all of Austria

[73] Assignee: Steyr-Daimler-Puch AG, Vienna, Austria

[21] Appl. No.: 316,476

[22] Filed: Feb. 27, 1989

[30] Foreign Application Priority Data

Mar. 11, 1988 [AT] Austria .................................. 660/88

[51] Int. Cl.⁵ .............................................. F16D 35/00
[52] U.S. Cl. ................................ 192/58 C; 192/58 B; 186/248
[58] Field of Search ................ 192/58 B, 58 C, 70.28, 192/85 AA, 112; 74/782; 180/233, 248, 244, 250

[56] References Cited

U.S. PATENT DOCUMENTS

| | | | |
|---|---|---|---|
| 3,760,922 | 9/1973 | Rolt et al. | 180/248 |
| 4,022,084 | 5/1977 | Pagdin et al. | 192/48.3 |
| 4,031,780 | 6/1977 | Dolan et al. | 192/35 |
| 4,040,271 | 8/1977 | Rolt et al. | 192/58 B |
| 4,048,872 | 9/1977 | Webb | 192/82 T |
| 4,058,027 | 11/1977 | Webb | 192/58 B |
| 4,286,686 | 9/1981 | Franke | 186/248 |
| 4,601,359 | 7/1986 | Weismann et al. | 180/248 |
| 4,618,045 | 10/1986 | Storz | 192/58 B |
| 4,697,621 | 10/1987 | Diessner et al. | 192/58 B |
| 4,729,262 | 3/1988 | Lanzer | 192/58 B |
| 4,747,464 | 5/1988 | Lanzer | 180/248 |
| 4,782,930 | 11/1988 | Kuroiwa et al. | 192/58 C |
| 4,844,219 | 7/1989 | Stockmar | 192/58 C |
| 4,846,299 | 7/1989 | Wies et al. | 180/249 |

FOREIGN PATENT DOCUMENTS

| | | | |
|---|---|---|---|
| 384086 | 9/1987 | Austria | 192/58 C |
| 3518682 | 11/1986 | Fed. Rep. of Germany | 192/58 C |
| 1357106 | 2/1971 | United Kingdom | 192/111 B |

*Primary Examiner*—Leslie A. Braun
*Assistant Examiner*—Nicholas Whitelaw
*Attorney, Agent, or Firm*—Marmorek, Guttman & Rubenstein

[57] ABSTRACT

A liquid-friction coupling comprises a liquid-containing housing, a shaft, which coaxially protrudes into the housing, and the interdigitating sets of inner and outer blades, which are axially slidably mounted on the shaft and in the housing, respectively, and are non-rotatably connected thereto. Annular spreading springs are disposed between adjacent inner blades or adjacent outer blades. The distance between adjacent inner and outer blades can be changed by means of an annular piston, which is operable from the outside of the housing. To permit control of the liquid friction coupling within wide limits, the annular piston has a planar inner end face, which extends close to the blades and substantially throughout the cross-section of the interior of the housing. When the piston is in its outermost position the liquid contained in the housing is not in excess of 60% of the liquid capacity of the housing. The liquid has a viscosity of at least 30,000 centistokes.

11 Claims, 2 Drawing Sheets

LIQUID FRICTION COUPLING AND MOTOR VEHICLE COMPRISING THE SAME

BACKGROUND OF THE INVENTION

1. Field of the Invention

This invention relates to a liquid friction coupling which comprises a housing that contains a viscous liquid, a shaft coaxially protruding into the housing, two interdigitating sets of inner and outer blades, which are axially slidably mounted on the shaft and in the housing, respectively, and are non-rotatably connected thereto, annular spreading springs, which are disposed between adjacent blades of one of said sets, and an annular piston, which is displaceable and sealed in said hosuing and is operable from the outside of the housing to change the distance between adjacent ones of said blades.

This invention relates also to a motor vehicle which comprises a motor, two driven axles and a planetary gear train, which serves to drive one of said two driven axles and comprises first, second and third torque-transmitting members, wherein said first torque-transmitting member is operatively connected to the motor and the second torque-transmitting member constitutes an output member for driving said one driven axle.

2. Description of the Prior Art

Such a liquid friction coupling is known from AT-A-384,086. The annular piston is adapted to be forced inwardly in the housing from the outside only against the force of the spreading springs by mechanical or hydraulic force and in its axially inner end face is formed with a recess so that a relatively large clearance space is left between that blade which is nearest to the piston and the effective surface of the piston. In that clearance space in the coupling housing, a separation of liquid and air may occur so that the ability to control the coupling by means of the annular piston may be adversely affected. It must be borne in mind that the air tends preferentially to accumulate in said clearance space so that hardly any air will be left between the blades and the inward movement of the piston can control the clutch only by a change of the width of the gap between adjacent blades rather than also by a change of the pressure of the air-liquid mixture in the gaps between adjacent blades. But the change of the width of the gaps is not sufficient in itself so that the known liquid friction coupling can be controlled only within relatively narrow limits.

SUMMARY OF THE INVENTION

It is an object of the invention so to improve the liquid friction coupling described first hereinbefore by the provision of simple technical means that the torque which is being transmitted in dependence on the speed difference between the inner and outer blades can be controlled in a wide range.

That object is accomplished in accordance with the invention in that the annular piston has a planar axially inner end face, which is normal to the axis and extends substantially throughout the interior cross-section of the housing and close to the blades, the liquid occupies not in excess of 60% of the liquid capacity of the housing when the piston is in its outermost position, and the liquid which is contained in the housing has a viscosity of at least 30,000 centistokes.

Because the annular piston has a planar inner end face, which extends close to the blades, there will be no substantial clearance space in which air might preferentially accumulate. As a result, a displacement of the piston will change not only the blade spacing but at the same time also the air volume between adjacent blades. Because no torque is transmitted by the air disposed in the gaps between adjacent blades, a decrease of that air volume effected by a pressure rise resulting from an inward displacement of the piston will result in a corresponding increase of the torque capacity of the coupling and an effective overall control will be enabled. Because the housing is filled to a relatively low degree—which is to be determined at 20° C. and under normal pressure and when the annular piston is in its outermost position, in which it has the largest possible distance from the adjacent blades—the torque which will be transmitted when a given differential speed occurs between the inner and outer blades will be reduced and the range in which a control can be effected will be increased in a downward direction. That result will particularly be produced if the liquid has a relatively high viscosity. For this reason a liquid having a viscosity of at least 60,000 centistokes will be preferred for a liquid friction coupling for use in the drive system of a motor vehicle.

In the known liquid friction coupling in which the annular piston can be only axially inwardly moved by external forces it has been found that the restoring movement of the piston only under the action of the spreading springs and of the internal pressure will be relatively small. This is undesirable particularly in couplings used in motor vehicles. For this reason an improvement is provided in accordance with the invention in that the piston is displaceable in both axial directions from the outside of the housing.

For the same reason, constricted passages are defined between the inner rims of the outer blades and the outer rims of the spreading springs if the spreading springs are disposed between adjacent ones of said inner blades or, if the spreading springs are disposed between adjacent outer blades, such constricted passages may be defined between the outer rims of the inner blades and the inner rims of the spreading springs. When the annular piston is moved quickly to its outermost position, a negative pressure will be created between the planar inner end face of the piston and the adjacent blade and there will be a pressure difference between that negative pressure and the pressure existing in the interior of the housing adjacent to the blades which are remote from the piston. That pressure difference will tend to push back the blades to their initial position.

In a liquid friction coupling which is intended for use in a motor vehicle and for this reason must comply with relatively narrow limits as regards size and weight, it will be desirable to permit a change of the width of the gaps between adjacent inner and outer blades between 0.1 mm and 0.6 mm by a displacement of the piston. The smallest width of such gap and the smallest distance between adjacent blades will depend on the spreading springs, which are disposed between adjacent blades of one set.

At a given speed difference between the housing and the shaft, a controllable liquid friction coupling in accordance with the invention will transmit a much higher torque than an uncontrollable coupling which has been designed for an intermediate value. But a higher torque being transmitted will involve a higher dissipation of power, which will dissipate as heat mainly via the outer blades to the housing. In order to take that heat transfer into account the outer blades are thicker than the inner blades and/or they consist of a material which has a high thermal conductivity, such as copper.

In a motor vehicle of the type described hereinbefore, the third torque-transmitting member of the planetary gear train is non-rotatably connected to the shaft of a liquid friction coupling in accordance with the invention and the housing of said coupling is held against rotation. In that case the liquid friction coupling and the planetary gear train constitute an interaxle differential between said two driven axles. Because the liquid friction coupling can be controlled, the distribution of the total torque between the two driven axles can be changed within very wide limits in dependence on the conditions of travel.

If the housing of the coupling could rotate with the shaft, as is the case in a conventionally arranged coupling, the liquid would separate from the air under centrifugal force and would become enriched adjacent to the shell of the housing. Such a separation between the air and the liquid would again decrease the control range. But because the housing is held against rotation in the motor vehicle in accordance with the invention, the liquid and air will always uniformly be mixed so that the wide control range of the coupling in accordance with the invention will fully be utilized.

DETAILED DESCRIPTION OF THE PREFERRED EMBODIMENT

Figure 1:
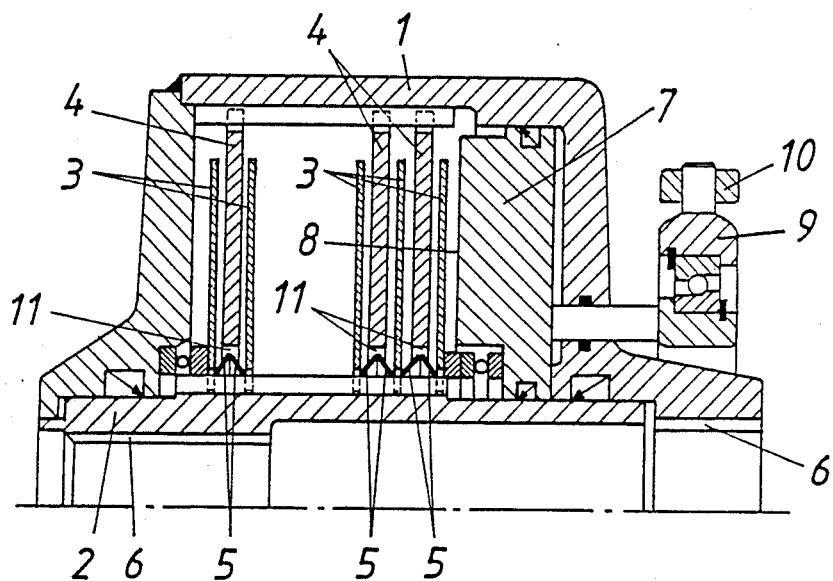
FIG. 1 is a simplified axial sectional view showing a liquid friction coupling in accordance with the invention.

An embodiment of the invention will now be described more in detail with reference to the drawing.

The illustrated liquid friction coupling comprises a housing 1, which contains a viscous liquid, a tubular shaft 2, which is rotatably mounted in and coaxially protrudes into the housing, and two interdigitating sets of inner blades 3 and outer blades 4, which are axially slidably mounted on the shaft 2 and in the housing 1, respectively, and are nonrotatably connected thereto. Spreading springs 5, which consist of disk springs, extend between adjacent inner blades 3. The housing 1 and the tubular shaft 2 may be nonrotatably connected to a driving member and to a driven member, respectively, and for that purpose are formed with splines 6.

An annular piston 7 is sealed in the housing 1 and is axially displaceable therein. The piston 7 has a planar inner end face 8, which is normal to the axis and extends substantially throughout the cross-section of the interior of the housing and close to the blades 3, 4. By means of an adjusting ring 9 that is operatively connected to a lever 10 or the like the annular piston is displaceable from the outside of the housing in both axial directions. Because relatively strong forces are required to push the piston into the housing, the piston is desirably displaced by hydraulic forces. Constructed passages 11 are provided between the inner rims of the outer blades 4 and the outer rims of the spreading springs 5. In the drawing, said constricted passages are shown in an exaggerated width. The outer blades 4 are much thicker than the inner blades and may be made of a material which has a high thermal conductivity.

Figure 2:
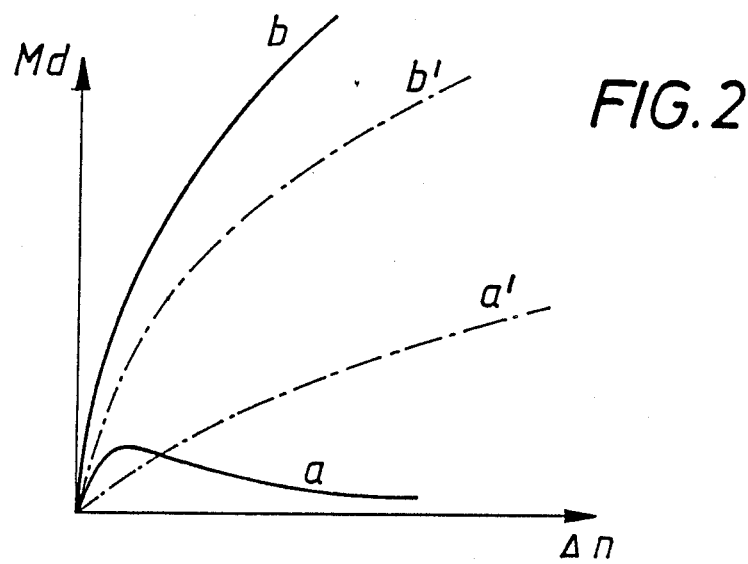
FIG. 2 is a graph illustrating the characteristic of the coupling.

In FIG. 2, the speed difference $\Delta n$ between the housing 1 and the shaft 2 is plotted along the axis of abscissas and the torque $M_d$ which is transmitted is plotted along the axis of ordinates. Curve a represents the torques which can be transmitted when the annular piston 7 is in its outermost position shown in FIG. 1, where the housing 1 contains the largest interior volume. The piston can then be shifted to permit a torque change in accordance with curve b. The wide control range between curves a and b is apparent. The liquid contained in the housing has a viscosity of about 60,000 centistokes. If a liquid is used which has a viscosity of only 25,000 centistokes, the torques represented by curves a' and b', respectively, will be obtained under conditions which are the same in other respects so that the control range will be much smaller.

When the piston is in its outermost position shown in FIG. 1 the degree to which the housing 1 is filled, i.e., the ratio of the liquid volume to the liquid capacity of the housing 1, will be less than 60% (at 20° C. and under normal pressure). By means of the annular piston 7 the width of the gaps between adjacent inner and outer blades 3, 4 can be reduced from 0.6 mm to 0.1 mm.

Figure 3:
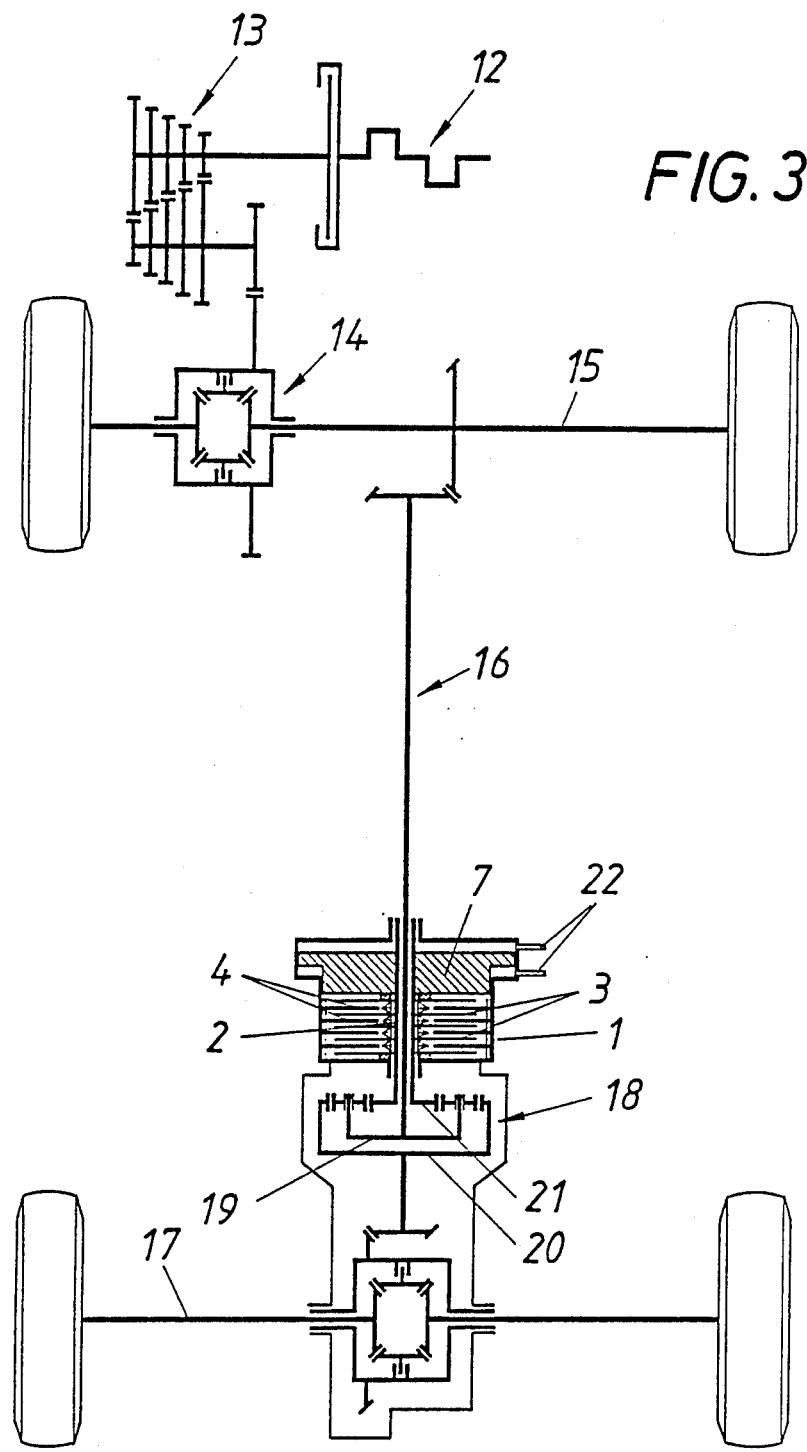
FIG. 3 is a diagrammatic representation of the drive means of a motor vehicle provided with the coupling in accordance with the invention.

In the passenger car shown in FIG. 3, the front axle 15 is driven from a motor 12 via a change-speed gear train 13 and a differential 14. The front axle 15 is connected by a power train 16 to the rear axle 17. The power train 16 includes a planetary gear train 18, which has a planet carrier 19 that is driven by the front axle 15 and a ring gear 20 for driving the rear axle 12. The sun gear 21 of the planetary gear train 18 is non-rotatably connected to the shaft 2 of a liquid friction coupling as shown in FIG. 1. The housing 1 of that coupling is held against rotation. The piston 7 comprises a stepped-piston portion which extends outside the housing 1 and to which hydraulic pressure can be applied via lines 22 to displace the piston.

We claim:

1. A liquid friction coupling comprising
   a housing,
   a shaft, which is rotatably mounted in and coaxially protrudes into said housing,
   interdigitating sets of interdigitating inner and outer blades, which are axially spaced apart and axially slidably mounted on said shaft and in said housing, respectively, and are non-rotatably connected thereto,
   annular spreading springs disposed between adjacent blades of one of said sets and urging said adjacent blades axially apart to form gaps between said adjacent blades,
   a viscous liquid located within said housing, said gaps between said blades being occupied by a liquid/air mixture, said liquid/air mixture transmitting torque between said adjacent blades,
   an annular piston, which is sealed in and protrudes from said housing and is axially displaceable therein from and to an axially outermost position to decrease and increase, respectively, the axial distance between adjacent ones of said blades, and
   actuating means for controlling the torque transmitted between said adjacent blades by adjusting the size of said gaps and the volume occupied by said liquid/air mixture between said adjacent blades, said actuating means being operatively connected to said piston outside said housing and operable to axially displace said piston in said housing, wherein said annular piston has a planar inner end face, which is normal to the axis of said housing and extends substantially throughout the interior cross-section of said housing and close to said blades, said liquid occupies not in excess of 60% of the liquid capacity of said housing, and said liquid has a viscosity of at least 30,000 centistokes.

2. The coupling set forth in claim 1, wherein said actuating means are operable to positively displace said piston axially inwardly and axially outwardly relative to said housing.

3. The coupling set forth in claim 1, wherein
said spreading springs are disposed between adjacent ones of said inner blades and have outer rims and
said outer blades have inner rims which define constricted passages with said outer rims of said spreading springs.

4. The coupling set forth in claim 1, wherein
said spreading springs are disposed between adjacent ones of said outer blades and have inner rims and
said inner blades have outer rims which define constricted passages with said inner rims of said spreading springs.

5. The coupling set forth in claim 1, wherein said piston is axially displaceable to change the distance between adjacent ones of said blades between 0.6 mm and 0.1 mm.

6. The coupling set forth in claim 1, wherein said outer blades are thicker than said inner blades.

7. The coupling set forth in claim 1, wherein said outer blades are made of a material having a high thermal conductivity.

8. The coupling set forth in claim 1, wherein said outer blades are made of copper.

9. The coupling of claim 1 wherein said liquid has a viscosity of about 60,000 centistokes.

10. A motor vehicle comprising
first and second driven axles,
a motor, which is operatively connected to said first driven axle,
a planetary gear train having first, second and third torque-transmitting members, said first torque-transmitting member being operatively connected to said motor, said second torque-transmitting member being operatively connected to said second driven axle, and a liquid friction coupling comprising a housing, a shaft, which is rotatably mounted in and coaxially protrudes into said housing, interdigitating sets of interdigitating inner and outer blades, which are axially spaced apart and axially slidably mounted on said shaft and in said housing, respectively, and are non-rotatably connected thereto, annular spreading springs disposed between adjacent blades of one of said sets and urging said adjacent blades axially apart to form gaps between said adjacent blades, a viscous liquid located within said housing, said gaps between said blades being occupied by a liquid/air mixtures, said liquid/air mixture transmitting torque between said adjacent blades, an annular piston, which is sealed in and protrudes from said housing and is axially displaceable therein from and to an axially outermost position to decrease and increase, respectively, the axial distance between adjacent ones of said blades, and actuating means for controlling the torque transmitted between said blades by adjusting the size of said gaps and the volume occupied by said liquid/air mixture between said adjacent blades, said actuating means being operatively connected to said piston outside said housing and operable to axially displace said piston in said housing, wherein said annular piston has a planar inner end face, which is normal to the axis of said housing and extends substantially throughout the interior cross-section of said housing and close to said blades, said liquid occupies not in excess of 60% of the liquid capacity of said housing, and said liquid has a viscosity of at least 30,000 centistokes, said third torque-transmitting member is non-rotatably connected to said shaft and said housing is held against rotation.

11. The vehicle of claim 9 wherein said liquid has a viscosity of about 60,000 centistokes.

* * * * *